United States Patent [19]

Sanchez

[11] Patent Number: 5,215,146
[45] Date of Patent: Jun. 1, 1993

[54] METHOD FOR REDUCING STARTUP TIME DURING A STEAM ASSISTED GRAVITY DRAINAGE PROCESS IN PARALLEL HORIZONTAL WELLS

[75] Inventor: James M. Sanchez, Carrollton, Tex.

[73] Assignee: Mobil Oil Corporation, Fairfax, Va.

[21] Appl. No.: 752,139

[22] Filed: Aug. 29, 1991

[51] Int. Cl.⁵ .............................................. E21B 43/24
[52] U.S. Cl. .................................. 166/263; 166/272; 166/306; 166/309; 166/50
[58] Field of Search ................. 166/50, 263, 269, 272, 166/303, 306, 309

[56] References Cited

U.S. PATENT DOCUMENTS

| | | | |
|---|---|---|---|
| 2,365,591 | 12/1944 | Ranney | 166/306 X |
| 4,344,485 | 8/1982 | Butler | 166/271 |
| 4,410,216 | 10/1983 | Allen | 166/50 X |
| 4,577,691 | 3/1986 | Huang et al. | 166/50 X |
| 4,653,583 | 3/1987 | Huang et al. | 166/50 X |
| 4,706,751 | 11/1987 | Gondouin | 166/263 X |
| 5,005,644 | 4/1991 | Wall et al. | 166/309 X |
| 5,085,275 | 2/1992 | Gondouin | 166/303 |

FOREIGN PATENT DOCUMENTS 1072442  2/1980  Canada .................................. 166/50

OTHER PUBLICATIONS

Edmunds et al, CIM Paper No. 91-65, "Effective Steam Assisted Gravity Drainage to Long Horizontal Well Pairs", Presented at the CIM/AOSTRA 1991 Technical Conference in Banff Apr. 21-24, 1991.

*Primary Examiner*—George A. Suchfield
*Attorney, Agent, or Firm*—McKillop A. J.; G. W. Hager; C. A. Malone

[57] ABSTRACT

A method for reducing the time during which steam moves in a lateral direction between two parallel superimposed horizontal wells when utilizing a Steam Assisted Gravity Drainage (SAGD) process. Foam is added while injecting steam into an upper horizontal well once steam breakthrough occurs in an interwell region. Foam enters the interwell region thereby causing an increased pressure gradient. This increased pressure gradient adds to the gravity force thereby providing a greater interstitial oil velocity which increases oil drainage between wells during startup.

9 Claims, 4 Drawing Sheets

METHOD FOR REDUCING STARTUP TIME DURING A STEAM ASSISTED GRAVITY DRAINAGE PROCESS IN PARALLEL HORIZONTAL WELLS

FIELD OF THE INVENTION

This invention relates to the use of foam to speed a startup portion of a Steam Assisted Gravity Drainage (SAGD) process in parallel horizontal wells. Specifically, the invention relates to the use of foam to increase a pressure gradient between horizontal injector and producer wells, after an initial localized steam breakthrough.

BACKGROUND OF THE INVENTION

World energy supplies are quite substantially impacted by the world's heavy oil resources. Indeed, heavy oil comprises 2,100 billion barrels of the world's total oil reserves. Processes for the economic recovery of these viscous reserves are clearly important.

Asphaltic, tar and heavy oil are typically in deposits near the surface with overburden depths that span a few feet to a few thousand feet. In Canada vast deposits of this oil are found in Athabasca, Cold Lake, Celtic, Lloydminster and McMurray reservoirs. In California heavy oil is found in the South Belridge, Midway Sunset, Kern River and other reservoirs.

In the large Athabasca and Cold Lake bitumen deposits oil is essentially immobile—unable to flow under normal natural drive primary recovery mechanisms. Furthermore, oil saturations in these formations are typically large. This limits the injectivity of a fluid (heated or cold) into the formation. Furthermore, many of these deposits are too deep below the surface to effectively and economically mine.

In-situ techniques for recovering viscous oil and bitumens have been the subject of much previous investigation and can be split into 3 categories: 1) cyclic processes involving injecting and producing a viscosity reducing agent; 2) continuous steaming processes which involve injecting a heated fluid at one well and displacing oil to another set of wells; and 3) a relatively new Steam Assisted Gravity Drainage process (SAGD) by R. M. Butler (U.S. Pat. No. 4,344,485).

Cyclic steam or solvent stimulation in these two reservoirs is severely hampered by the lack of any significant steam injectivity into the respective formations. Hence, in the case of vertical wells a formation fracture is required to obtain any significant injectivity into the formation. Some success with this technique has been obtained in the Cold Lake reservoir at locations not having any significant underlying water aquifer. However, if a water aquifer exists beneath the vertical well located in the oil bearing formation, fracturing during steam injection results in early and large water influx during the production phase. This substantially lowers the economic performance of wells. In addition, cyclic steaming techniques reduce the economic viability of the process. Clearly, steam stimulation techniques in Cold Lake and Athabasca deposits are severely limited.

Vertical well continuous steaming processes are not technically or economically feasible in very viscous bitumen reservoirs. Oil mobility is simply far too small to be produced from a cold production well as is done in California type of reservoirs. Steam injection from one well and production from a remote production well are not possible unless a formation fracture is again formed. Formation fractures between wells are very difficult to control and there are operational problems associated with fracturing in a controlled manner so as to intersect an entire pattern of wells. Hence, classical steam flooding, even in the presence of initial fluid injectively when artificially induced by a fracture, has significant limitations.

Steam Assisted Gravity Drainage (U.S. Pat. No. 4,344,485; Butler, 1982) describes a parallel set of horizontal wells spaced relatively close together. In this process both wells are pre-heated by conduction. As fluid between the wells warms, a pressure difference is applied between the upper and lower wells to drive the fluid from between the wells. A SAGD startup process has been described in detail (Edmunds, N. R. and Gittins, S. D.; CIM Paper No. 91-65). When steam breaks through at some point between the horizontal wells, the pressure difference disappears and large amounts of steam are produced from the lower well. At this point in the startup, temperature control at the wellhead begins and produced steam volumes are throttled, placing the rest of the startup process in a gravity dominated regime.

Steam begins to rise upwardly and spreads laterally along the length of the well. The process is completely governed by gravity due to the imposition of steam trap control. For long wells a complete formation of a steam chamber along the length of the wellbore may take several months—thereby reducing the effectiveness of the long wellbore.

Complicating this problem is a substantial impossibility of drilling two perfectly parallel horizontal wells—either from a tunnel or from the surface. It is more probable that the two wells will have some wavy characteristics (sinuosity). Hence, steam breakthrough is more likely to occur at the point of closest spacing of the two wells. A picture of the initial breakthrough looks like two very long horizontal wells (say 500 meters) with only 1 or 2 meters having steam communication. The steam chamber can now grow only slowly along the length of the well.

Therefore, what is needed is a method of forcing the steam/liquid communication zone between wells to grow laterally, during the startup phase, at a rate substantially faster than that obtained by pure gravity drainage.

SUMMARY OF THE INVENTION

This invention is directed to a method to reduce startup time in a Steam Assisted Gravity Drainage (SAGD) process where parallel horizontal wells are used to remove hydrocarbonaceous fluids from a formation or reservoir. In the practice of this invention, steam is circulated within upper and lower horizontal wells while maintaining a substantial pressure gradient between said wells. By maintaining this pressure gradient, hot fluids are forced from the upper well into the lower well. Steam is continuously circulated until it breaks through from the upper to said lower well which causes a steam breach zone to come into existence.

A surfactant is added to liquid entering the upper well along with steam in an amount sufficient to generate foam and fill the steam breach zone. The foam filled steam breach zone causes an increase in the pressure gradient, between the two wells. An increase in the pressure gradient causes a complete steam chamber to be formed, along the wells which causes substantial increased displacement of hydrocarbonaceous fluids between said wells. Increased displacement of hydrocarbonaceous fluids allows the near well areas to be heated substantially more quickly than before possible, thereby reducing startup time during a SAGD process.

It is therefore a primary object of this invention to substantially reduce the time of startup in the creation of a steam chamber during a Steam Assisted Gravity Drainage process.

Another object of this invention is to combine the use of foam with dual horizontal wells to improve steam process performance by reducing startup time.

It is also an object of this invention to augment a gravity drainage process during startup by increasing the pressure gradient between well pairs after steam first breaches an area between the wellbores.

These and other objects of this invention will become apparent to those skilled in the art when reading this specification and appended claims.

DESCRIPTION OF THE PREFERRED EMBODIMENTS

Figure 1:
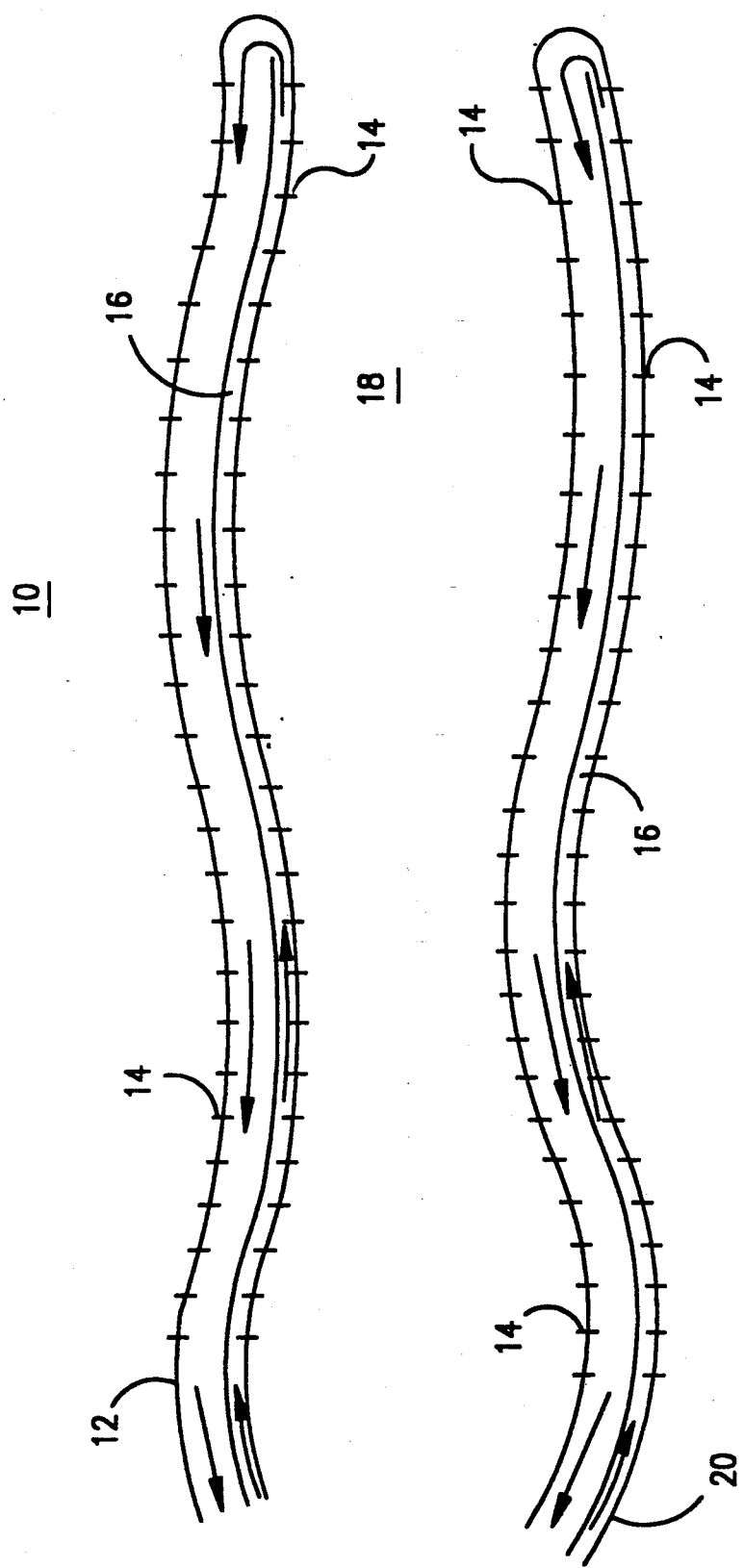
FIG. 1 is a cross-sectional, axial, schematic view of a dual horizontal well pair where vertical sinuousity has been depicted as would exist in a pair of wells drilled in a formation.

In order to provide additional clarity to the invention, the current method of startup is described in order to contrast the old startup method with the new startup method. Current startup procedures detailed herein may be found in the recent publication "Effective Steam Assisted Gravity Drainage to Long Horizontal Well Pairs" by N. R. Edmunds and S. D. Gittins on page 65-2 of the CIM proceedings for 1991. The startup section from that paper is quoted below.

"SAGD with parallel wells depends on the existence of fluid communication between the injector and producer. In the McMurray field, the initial bitumen viscosity and saturation are so high that communication must be developed artificially before SAGD can proceed. The Phase A startup procedure... used a combination of conduction heating followed by a mild steamflood, implemented by circulating steam in both wells with a pressure differential (at the wellhead) of about 350 kPa.

Thermal conduction can be used to heat the sand in the vicinity of the wellbore, regardless of fluid transmissibility, by circulating hot fluid in the well. For an isolated single well, heating is very slow at radii greater than a meter or so, but simulations showed that when a second hot well is nearby, conduction is surprisingly effective in the space between the wells for separations of several meters; useful temperatures can be generated in a few months. This delay is more than compensated for by predictability: the thermal properties of oil sand are well known and fairly homogeneous, so that conduction heating is virtually guaranteed if simple conditions are met.

Once the bitumen is marginally mobile, at around 50-100 degrees C., hot water can displace enough of it to finger through and initiate rapid convective heating. Under a small pressure differential, the ensuing steamflood takes only a few days to reach the producer, while at the same time the new steam chamber begins growing up and out due to SAGD.

The discussion now returns to the three dimensional, long well pair. . . . It is easy to see how an initial startup can be created,. . ., by applying a pressure differential. After the first breakthrough, however, *it is not possible to maintain a significant pressure difference without driving huge volumes of steam directly from injector to producer (Emphasis added)*. It will be shown. . . that no pressure differential is in fact required: startup can occur by gravity alone at any cross section of the well pair where the liners are kept hot, they are within a certain distance of each other, and there is reasonable permeability between them.

At this point it is useful to review how wellbore conditions are controlled, and what happens after the initial breakthrough, in a real well pair of significant length. As reported. . ., the proper injection rate is that which maintains the desired steam chamber pressure by replacing any steam that is condensed at the expanding front. This is accomplished at an [Underground Test Facility] UTF with an industrial pressure controller at the wellhead.

The Phase A production control scheme essentially controlled temperature, rather than pressure or rate. The temperature set point was chosen based on the flowing pressure, so that fluids were produced to maintain the wellhead temperature a specified value below the boiling point of water. Correct drawdown was automatically maintained, since no steam could be produced but neither could production accumulate and cool at the bottom of the chamber. This scheme is called steam trap control, because it mimics the function of standard industrial thermodynamic steam trap.

The most important point. . . is that, if the permeability is good, gravity alone is sufficient to allow startup; in other words a SAGD process can be operated at an injector annulus pressure that is identical to the producer annulus pressure. The startup could be characterized as heating the bitumen and then letting it fall through the sand into the producer.

As an example of how fast this can be, the superficial velocity of bitumen falling through a column of porous media having equal pressures at top and bottom can be calculated from Darcy's Law. In consistent units, $$U_o{}^q = \frac{k_o P_o g_o}{\mu_o} \qquad (1)$$

where $k_o$ is the effective permeability to bitumen and $u_o$ is the bitumen viscosity. For Athabasca bitumen at about 200° C., and 5 Darcy's effective permeability, the resulting superficial velocity will be . . . about 40 cm/day."

From the discussion presented in Edmunds and Gittins and detailed above, it is clear that: startup is controlled by conduction and then, after steam communication, gravity.

Conduction begins the process by interwell heating until steam circulated in the upper well breaks through at the lower wellbore. After breakthrough at the lower well steam is throttled back and gravity drainage continues to power the startup.

In the practice of the present invention, startup begins by making use of interwell conduction heating precisely as used in the old startup method as is shown in FIG. 1. Both wells are steam circulated to provide conduction heating in the interwell region. A fixed, nonzero pressure gradient held between the upper and lower wellbore slowly convects hot water and steam from the upper well to the lower well. When sufficiently warmed, first water and then steam breaks through at a small, localized area between the wellbores.

As steam breakthrough occurs, the pressure gradient between the wellbores vanishes for reservoirs having reasonable permeability. As noted in the discussion above, further clearance of oil between the wellbores occurs by gravity drainage alone.

At the time of breakthrough, 1-2% solution of a high temperature, commercial surfactant (SD-1020, a nonionic surfactant by Chevron for example) is added to liquid injected in the upper well. In addition, one mole percent (1 mol. %) of nitrogen is added to the injection steam. The foam should not be pre-formed so as to minimize axial pressure gradients within the wellbore. Steam, rather than being choked back in the production well, continues to be produced. As surfactant solution flows past the point of communication some of it flows into the porous medium. Vapor and liquid surfactant solution are known to generate in-situ foam within a porous medium. Thus, the breach between the two parallel horizontal wellbores is partially plugged temporarily.

Foam formation within the steam breached zone between wells permits a pressure gradient to be maintained after steam breakthrough between wells—in contrast to the current method where the pressure gradient vanishes as steam breaks through. This is the key to a faster startup. As more steam is formed between the wells, more foam forms continuously permitting a pressure gradient to exist between the upper and lower wellbores.

Once the entire length of the horizontal well pair has experienced steam communication, surfactant injection is stopped. The total volume of surfactant between well pairs will be small and easily removed by produced fluids.

After surfactant injection is stopped, steam trap control is begun thereby choking off steam at the production wellbore and initiating typical SAGD chamber rise.

As is shown in FIG. 1, upper horizontal well 12 and lower horizontal well 20 are drilled into formation or reservoir 10. Wells 12 and 20 contain slots or perforations 14. An interwell region 18 is positioned between wells 12 and 20. Steam is circulated into wells 12 and 20 via tubing 16. Steam exiting tubing 16 is directed into reservoir 10 via slots 14 in wells 1 and 20. Steam is continuously circulated in wells 12 and 20 while maintaining a significant pressure gradient between both wells. Wellbore or well arrangements which permit continuous circulation are discussed by Butler in U.S. Pat. No. 4,344,485 which issued on Aug. 17, 1982. This patent is incorporated by reference herein. As the interwell region or zone 18 between wells 12 and 20 warms, hot fluid is forced from upper well 12 to lower well 20 by the pressure gradient.

Figure 2:
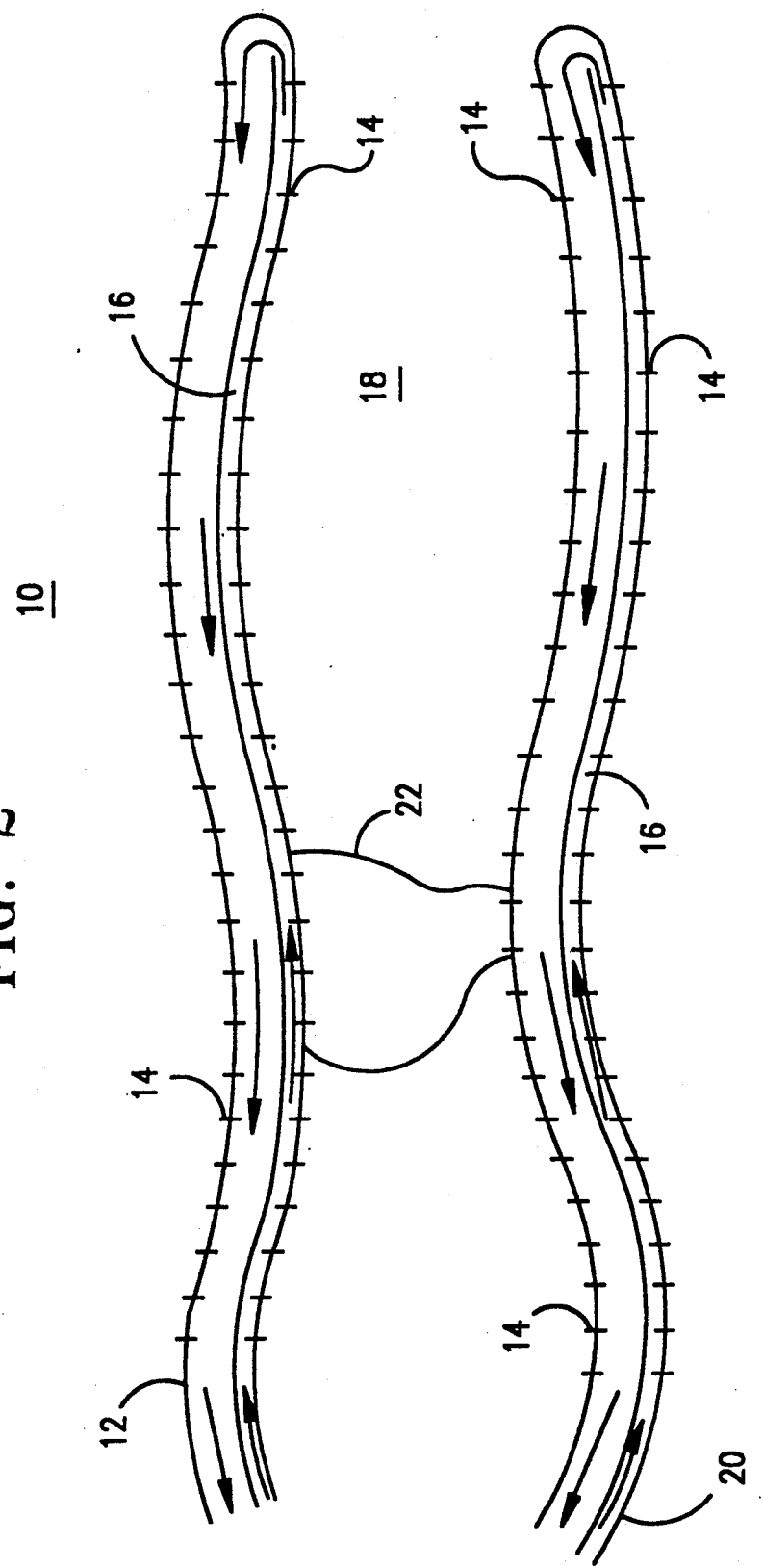
FIG. 2 is a schematical representation which demonstrates steam breakthrough at the point of closest approach between two superimposed horizontal wells.

When enough heating has taken place, water channels through from upper well 12. Steam channels through post water break through. FIG. 2 provides a schematic representation of steam filled breached zone 22. At the time of steam breakthrough, the pressure differential vanishes. Gravity takes over as the dominant mechanism of draining the oil between wells.

Figure 3:
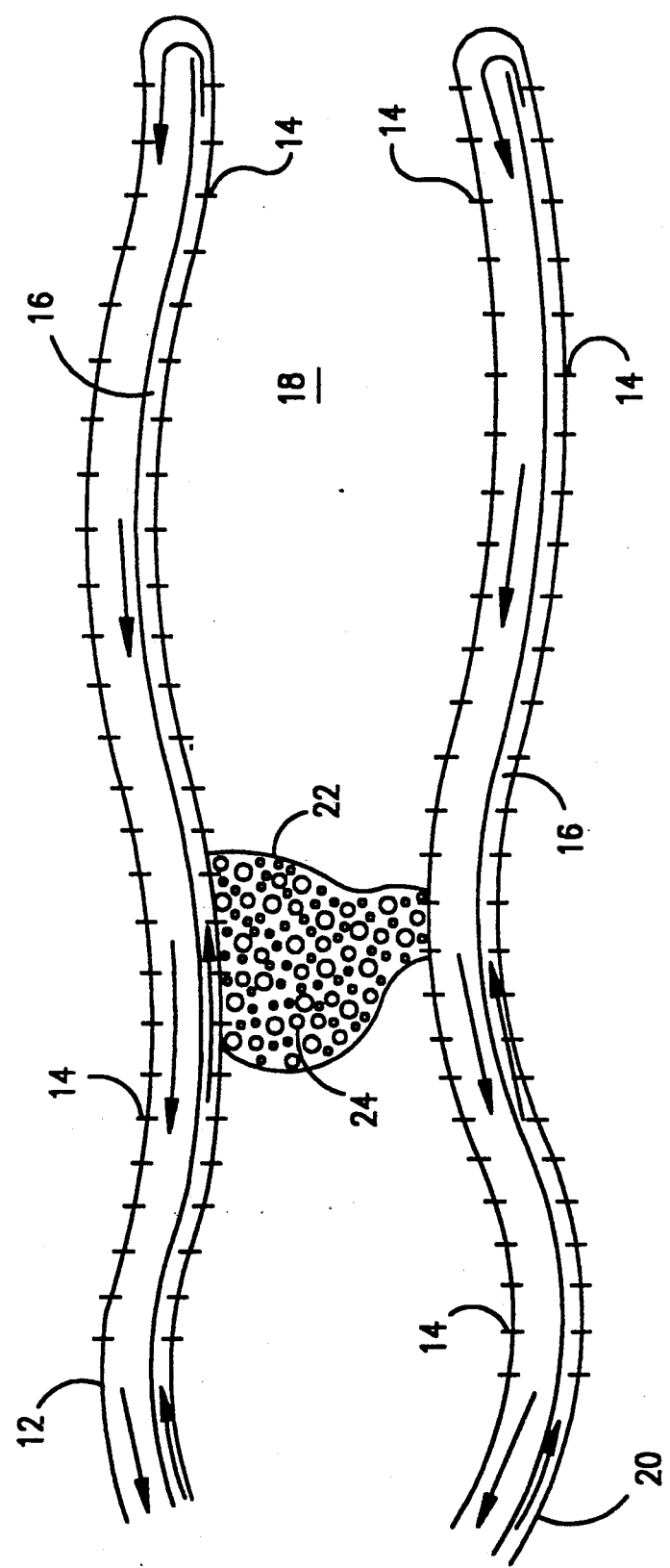
FIG. 3 demonstrates schematically foam formation in a steam breached zone between two superimposed horizontal wells.

At this point, surfactant and 1.0 mole % nitrogen are added to a liquid stream with enough concentration (1-2%) to generate a relatively strong foam 24 in steam breached zone 22 in interwell region 18. The production or lower well 20 is not put on steam trap control although the total amount of steam produced may be regulated. A pressure gradient now exists as a result of the flow resistance caused by foam 24 between wellbores 12 and 20 as shown in FIG. 3. This added pressure gradient aids gravity in displacing the oil from between wellbores 12 and 20.

As an example consider the former numerical example (1) with an additional component from the pressure. Here the equation for the flow velocity is:

$$u_o^+ = \frac{k_o P_o g}{\mu_o} + \frac{k_o \Delta P}{\mu_o L} \qquad (2)$$

where $\Delta P$ is the pressure differential between wellbores and L is the interwell wellbore spacing. Numerically, the flow velocities, as a function of increased pressure for an interwell spacing of 7 meters, are shown in Table 1.

TABLE 1

Influence of Small Interwell Pressure Gradient on Interwell Displacement Velocity

| $\Delta P$ (psia) | $k_o \Delta/\mu_o L$ (cm/day) | $k_o P_o g/\mu_o = U_o q$ (cm/day) | $U_o +$ (cm/day) | $U_o + /U_o g$ |
|---|---|---|---|---|
| 0.00 | 0.000 | 39.4 | 39.4 | 1.00 |
| 0.01 | 0.046 | 39.4 | 39.5 | 1.00 |
| 0.10 | 0.427 | 39.4 | 39.9 | 1.01 |
| 1.00 | 4.410 | 39.4 | 43.8 | 1.11 |
| 10.0 | 44.20 | 39.4 | 83.6 | 2.12 |
| 50.0 | 220.8 | 39.4 | 260.0 | 6.60 |

As can be seen from the above table, even relatively small pressure gradient increases can substantially increase the displacement velocity. Increased displacement velocities are directly related to reduced startup time. The faster the steam zone communicates in the lateral direction along the two wellbores, the faster a full SAGD process can start producing oil.

Figure 4:
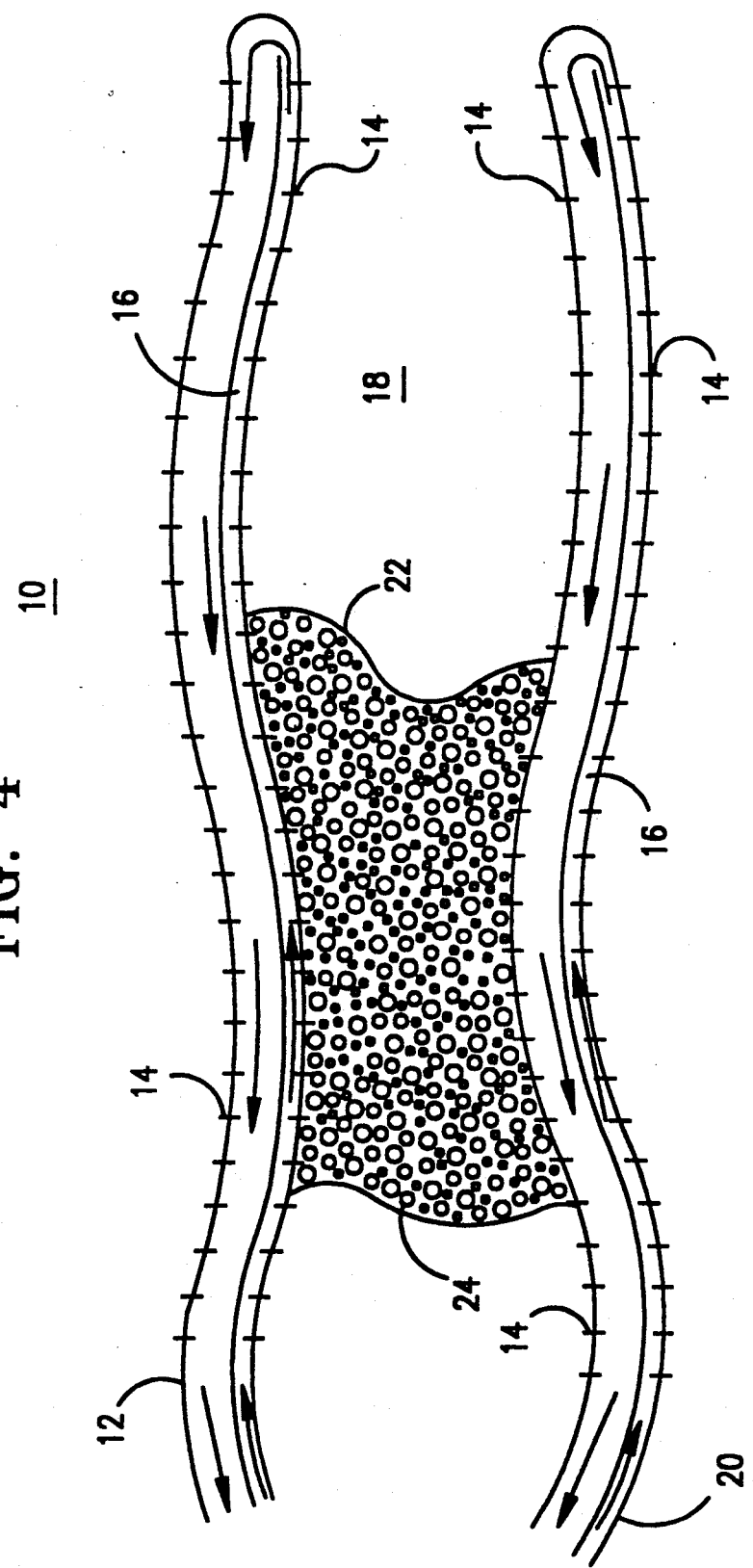
FIG. 4 is a schematic representation that demonstrates a lateral growth of a steam/liquid/foam region between superimposed horizontal wells.

FIG. 4 depicts the lateral steam foam in interwell region 18 between the wellbores 12 and 20 prior to chamber rise. Increased rates of propagation in interwell region 18 result in a faster startup time for the whole SAGD process thereby reducing the steam oil ratio and increasing process performance. Although wellbore 12 and 20 are shown in an above and below relationship, those skilled in the art will readily recognize that other wellbore arrangements will work similarly e.g., side by side.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed:

1. A method to reduce startup time in a Steam Assisted Gravity Drainage Process where parallel horizontal wells are utilized in a reservoir comprising:
   a) circulating steam within upper and lower horizontal wells while maintaining a substantial pressure gradient between said wells which causes hot fluids to be forced from the upper well to said lower well;
   b) continuing steam circulation until steam breaks through from the upper to said lower well thereby making a steam breach zone between the wells;
   c) directing a liquid into the upper well which liquid contains sufficient surfactant along with the steam which causes a foam to form in the steam breached zone so as to increase the pressure gradient there between; and
   d) displacing hydrocarbonaceous fluids between the wells because of the pressure gradient increase which causes the formation of a complete steam chamber along said wells which reduces the startup time during a Steam Assisted Gravity Drainage process.

2. The method as recited in claim 1, step a), where the hot fluids comprise water, steam, and hydrocarbonaceous fluids.

3. The method as recited in claim 1, step d), where the reduction in startup time results in a reduced ratio of steam to oil and an efficiency increase of the Steam Assisted Gravity Drainage process.

4. The method as recited in claim 1, step c), where the pressure gradient increase results in a substantially increased displacement velocity of hydrocarbonaceous fluids from said reservoir.

5. The method as recited in claim 1 where the surfactant is a high temperature surfactant.

6. The method as recited in claim 1 where the surfactant is a high temperature surfactant in an amount of about 1 to about 2%.

7. The method as recited in claim 1 where said surfactant is a high temperature surfactant in an amount of about 1 to about 2% and nitrogen in an amount of about one mole percent is added to the steam.

8. The method as recited in claim 1 where in step c) surfactant is eliminated from said liquid once steam communication is established along the entire length of the upper and lower horizontal wells.

9. The method as recited in claim 1 where in step c) surfactant is eliminated from said liquid once steam communication is established along the entire length of both wells and a temperature set point is chosen based on the steam's flowing pressure thereby producing fluids to maintain a wellhead temperature at a specified value below the boiling point of water which maintains a correct drawdown.

* * * * *